(12) United States Patent
Zhang et al.

(10) Patent No.: US 10,499,436 B2
(45) Date of Patent: Dec. 3, 2019

(54) PHYSICAL RANDOM ACCESS CHANNEL AND RANDOM ACCESS RESPONSE DETECTION FOR USER EQUIPMENT

(71) Applicant: NOKIA SOLUTIONS AND NETWORKS OY, Espoo (FI)

(72) Inventors: Yan Ji Zhang, Beijing (CN); Chunli Wu, Beijing (CN); Benoist Pierre Sebire, Tokyo (JP); Guillaume Decarreau, Munich (DE); Chun Hai Yao, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 4 days.

(21) Appl. No.: 15/542,972

(22) PCT Filed: Jan. 30, 2015

(86) PCT No.: PCT/CN2015/071997
§ 371 (c)(1),
(2) Date: Jul. 12, 2017

(87) PCT Pub. No.: WO2016/119237
PCT Pub. Date: Aug. 4, 2016

(65) Prior Publication Data
US 2018/0176957 A1    Jun. 21, 2018

(51) Int. Cl.
*H04L 12/24*   (2006.01)
*H04L 12/801*  (2013.01)
(Continued)

(52) U.S. Cl.
CPC .......... *H04W 74/0833* (2013.01); *H04L 1/00* (2013.01); *H04L 1/08* (2013.01); *H04L 5/0053* (2013.01);
(Continued)

(58) Field of Classification Search
CPC .. H04W 74/0833; H04L 27/2613; H04L 1/00; H04L 27/2694
See application file for complete search history.

(56) References Cited

U.S. PATENT DOCUMENTS

2006/0274712 A1* 12/2006 Malladi .............. H04B 1/70735
                                                         370/345
2015/0016312 A1    1/2015 Li et al.
(Continued)

FOREIGN PATENT DOCUMENTS

| CN | 102308649 A | 1/2012 |
| CN | 104205670 A | 12/2014 |

OTHER PUBLICATIONS

International Search Report & Written Opinion dated Nov. 2, 2015 corresponding to International Patent Application No. PCT/CN2015/071997.

(Continued)

*Primary Examiner* — Brian S Roberts
*Assistant Examiner* — Abusayeed M Haque
(74) *Attorney, Agent, or Firm* — Square Patton Boggs (US) LLP

(57) ABSTRACT

Systems, methods, apparatuses, and computer program products of physical random access channel (PRACH) selection and random access response (RAR) detection are provided. One method includes specifying, by a network node, a starting point for preamble repetition having a repetition level such that all user equipment (UEs) of the same repetition level start the preamble repetition on a same physical random access channel (PRACH) resource, determining when a series of the preamble repetition is over, and transmitting a random access response (RAR) when the repetition series is finished.

20 Claims, 5 Drawing Sheets

(51) Int. Cl.

| | |
|---|---|
| *H04L 5/14* | (2006.01) |
| *H04W 74/08* | (2009.01) |
| *H04L 1/00* | (2006.01) |
| *H04L 1/08* | (2006.01) |
| *H04L 5/00* | (2006.01) |
| *H04L 27/26* | (2006.01) |
| *H04W 72/04* | (2009.01) |
| *H04W 74/00* | (2009.01) |

(52) U.S. Cl.
CPC ...... *H04L 27/2613* (2013.01); *H04L 27/2692* (2013.01); *H04W 72/0446* (2013.01); *H04W 74/006* (2013.01)

(56) References Cited

U.S. PATENT DOCUMENTS

| | | | | |
|---|---|---|---|---|
| 2016/0007377 A1* | 1/2016 | Frenne | ................ | H04W 56/001 370/329 |
| 2016/0165640 A1* | 6/2016 | Yang | .................... | H04W 74/08 370/336 |
| 2016/0262182 A1* | 9/2016 | Yang | ....................... | H04W 4/70 |
| 2016/0353440 A1* | 12/2016 | Lee | ......................... | H04W 4/70 |
| 2017/0318501 A1* | 11/2017 | Vikberg | .............. | H04W 72/085 |

OTHER PUBLICATIONS

Alcatel-Lucent et al., "PRACH Coverage Enhancement for MTC UE," 3GPP, R1-135155, 3GPP TSG-RAN WG1 Meeting #75, San Francisco, CA, USA, Nov. 11-15, 2013, Nov. 15, 2013.
Ericsson et al., "New WI proposal: Further LTE Physical Layer Enhancements for MTC," 3GPP, RP-141660, 3GPP TSG RAN Meeting #65, Edinburgh, Scotland, Sep. 9-12, 2014.
3GPP TS 36.211 V123.0 (Sep. 2014), Technical Specification, 3rd Generation Partnership Project; Technical Specification Group Radio Access Network; Evolved Universal Terrestrial Radio Access (E-UTRA); Physical channels and modulation (Release 12), Sep. 2014.
3GPP TS 36321 V12.3.0 (Sep. 2014), Technical Specification, 3rd Generation Partnership Project; Technical Specification Group Radio Access Network; Evolved Universal Terrestrial Radio Access (E-UTRA); Medium Access Control (MAC) protocol specification (Release 12), Sep. 2014.
3GPP TS 36331 V12.4.0 (Dec. 2013), Technical Specification, 3rd Generation Partnership Project; Technical Specification Group Radio Access Network; Evolved Universal Terrestrial Radio Access (E-UTRA); Radio Resource Control (RRC); Protocol specification (Release 12), Dec. 2014.
Notice to File a Response dated Feb. 26, 2019 corresponding to Korean Patent Application No. 10-2017-7024190.

* cited by examiner

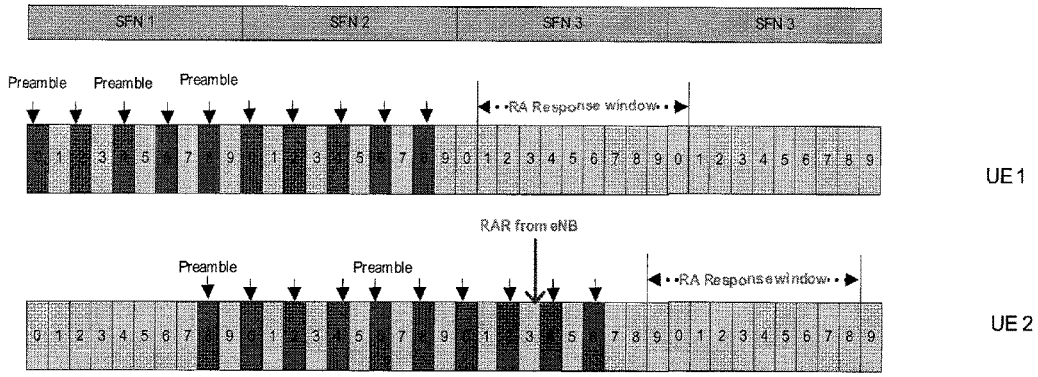
Fig. 1
| SFN # | 0 | | | | | 1 | | | | | 2 | | | | | 3 | | | | | 4 | | | | | 5 | | | | | 6 | | | | | 7 | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| sf # | 0 | 2 | 4 | 6 | 8 | 0 | 2 | 4 | 6 | 8 | 0 | 2 | 4 | 6 | 8 | 0 | 2 | 4 | 6 | 8 | 0 | 2 | 4 | 6 | 8 | 0 | 2 | 4 | 6 | 8 | 0 | 2 | 4 | 6 | 8 | 0 | 2 | 4 | 6 | 8 |
| I_PRACH | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 |
Fig. 2
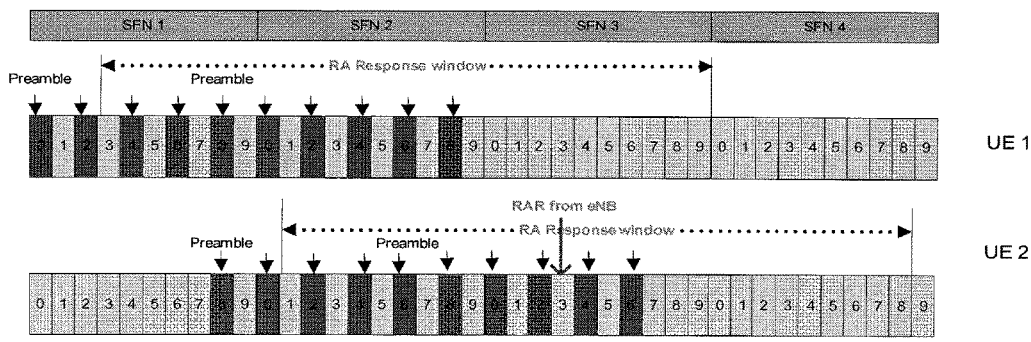
Fig. 3

```
Ra-ResponseWindowSize ::=            ENUMERATED {
                                         sf2, sf3, sf4, sf5, sf6, sf7,
                                         sf8, sf10, sf16, sf32, sf64}  -- the window size
could be defined according the required repetition number for each repetitional level.

Ra-ResponseWindowSizeElement ::=     SEQUENCE {
    repetitionLevel                      ENUMERATED {
                                             n1, n2, n3},
    ra-ResponseWindowSize                Ra-ResponseWindowSizeList
}

Ra-ResponseWindwSizeList := SEQUENCE (SIZE (1..maxRepetitionLevel)) OF Ra-
ResponseWindowSizeElement maxRepetitionLevel  INTEGER ::= 3    -- Maximum number of repetition level, which is agreed as 3 by
RAN1

RACH-ConfigCommon ::=        SEQUENCE {
    preambleInfo                         SEQUENCE {
        numberOfRA-Preambles                 ENUMERATED {
                                                 n4, n8, n12, n16 ,n20, n24, n28,
                                                 n32, n36, n40, n44, n48, n52, n56,
                                                 n60, n64},
        preamblesGroupAConfig                SEQUENCE {
            sizeOfRA-PreamblesGroupA             ENUMERATED {
                                                     n4, n8, n12, n16 ,n20, n24, n28,
                                                     n32, n36, n40, n44, n48, n52, n56,
                                                     n60},
            messageSizeGroupA                    ENUMERATED {b56, b144, b208, b256},
            messagePowerOffsetGroupB             ENUMERATED {
                                                     minusinfinity, dB0, dB5, dB8, dB10, dB12,
                                                     dB15, dB18},
            ...
        }          OPTIONAL                                                               -- Need OP
    },
    powerRampingParameters           PowerRampingParameters,
    ra-SupervisionInfo               SEQUENCE {
        preambleTransMax                 PreambleTransMax,
        ra-ResponseWindowSizeList        Ra-ResponseWindowSizeList,
        mac-ContentionResolutionTimer    ENUMERATED {
                                             sf8, sf16, sf24, sf32, sf40, sf48,
                                             sf56, sf64}
    },
    maxHARQ-Msg3Tx                   INTEGER (1..8),
    ...
}
```

Fig. 4

PHYSICAL RANDOM ACCESS CHANNEL AND RANDOM ACCESS RESPONSE DETECTION FOR USER EQUIPMENT

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), future 5G radio access technology, and/or High Speed Packet Access (HSPA).

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the enhanced Node B (eNodeB or eNB).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility. One the key features of LTE-A, introduced in LTE Rel-10, is carrier aggregation, which allows for increasing the data rates through aggregation of two or more LTE carriers.

A random access channel (RACH) refers to the shared channel which may be used by UEs to access the network for call set-up and data transmission. RACH is transport-layer channel; the corresponding physical-layer channel is the physical random access channel (PRACH), which may be used for initial access and when the UE losses its uplink synchronization.

SUMMARY

One embodiment is directed to a method that may include specifying, by a network node, a starting point for preamble repetition of a repetition level such that all user equipments (UEs) of the same repetition level start the preamble repetition on a same physical random access channel (PRACH) resource. The method may also include determining when a series of the preamble repetition is over, and transmitting a random access response (RAR) when the repetition series is finished.

Another embodiment is directed to an apparatus that may include specifying means for specifying a starting point for preamble repetition of a repetition level such that all user equipments (UEs) of the same repetition level start the preamble repetition on a same physical random access channel (PRACH) resource. The apparatus may also include determining means for determining when a series of the preamble repetition is finished, and transmitting means for transmitting a random access response (RAR) when the repetition series is finished.

Another embodiment is directed to a computer program embodied on a computer readable medium. The computer program may be configured to control a processor to perform a process including specifying a starting point for preamble repetition of a repetition level such that all user equipments (UEs) of the same repetition level start the preamble repetition on a same physical random access channel (PRACH) resource. The process may also include determining when a series of the preamble repetition is over, and transmitting a random access response (RAR) when the repetition series is finished.

Another embodiment is directed to a method that may include transmitting, by a user equipment, preamble repetition starting from a specific frame and subframe derived from configured physical random access channel (PRACH) resource and a repetition level of the preamble repetition. The method may also include receiving at least one random access response when a series of the preamble repetition is finished.

Another embodiment is directed to an apparatus that may include transmitting means for transmitting preamble repetition starting from a specific frame and subframe derived from configured physical random access channel (PRACH) resource and a repetition level of the preamble repetition. The apparatus may also include receiving means for receiving at least one random access response when a series of the preamble repetition is finished.

Another embodiment is directed to a computer program embodied on a computer readable medium. The computer program may be configured to control a processor to perform a process including transmitting preamble repetition starting from a specific frame and subframe derived from configured physical random access channel (PRACH) resource and its repetition level. The process may also include receiving at least one random access response when a series of the preamble repetition is finished.

Another embodiment is directed to a method that may include transmitting, by a user equipment, a preamble at any subframe with a physical random access channel (PRACH) resource corresponding to a preamble repetition level. A random access response (RAR) window may start with transmission of a first preamble attempt. Another embodiment includes starting a window after each transmission, so that the UE maintains multiple overlapped RAR windows, one RAR window for each preamble transmission. The method may also include monitoring for the random access response (RAR) during the random access response (RAR) window, but skipping the monitoring during subframes where the user equipment performs retransmission of the preamble attempt.

Another embodiment is directed to an apparatus that may include transmitting means for transmitting a preamble attempt at any subframe with a physical random access channel (PRACH) resource corresponding to a preamble repetition level. A random access response (RAR) window may start with transmission of a first preamble attempt. In another embodiment, a window may be started after each transmission, so that the UE maintains multiple overlapped RAR windows, one RAR window for each preamble transmission. The apparatus may also include monitoring means for monitoring for the random access response (RAR) during the random access response (RAR) window, but skipping the monitoring during subframes where the apparatus performs retransmission of the preamble attempt.

Another embodiment is directed to a computer program embodied on a computer readable medium. The computer program may be configured to control a processor to perform a process including transmitting a preamble attempt at any subframe with a physical random access channel (PRACH) resource corresponding to a preamble repetition level. A random access response (RAR) window may start with transmission of a first preamble attempt. Another embodiment includes starting a window after each transmission, so that the UE maintains multiple overlapped RAR windows, one RAR window for each preamble transmission. The process may also include monitoring for the random access response (RAR) during the random access response (RAR) window, but skipping the monitoring during subframes where the user equipment performs retransmission of the preamble attempt.

BRIEF DESCRIPTION OF THE DRAWINGS

For proper understanding of the invention, reference should be made to the accompanying drawings, wherein:

FIG. 1 illustrates a block diagram according to an embodiment;

FIG. 2 illustrates a block diagram according to another embodiment;

FIG. 3 illustrates a block diagram according to another embodiment;

FIG. 4 illustrates an example of a defined list of ra-ResponseWindowSize mapping to different repetition level, according to an embodiment;

DETAILED DESCRIPTION

Figure 5A:
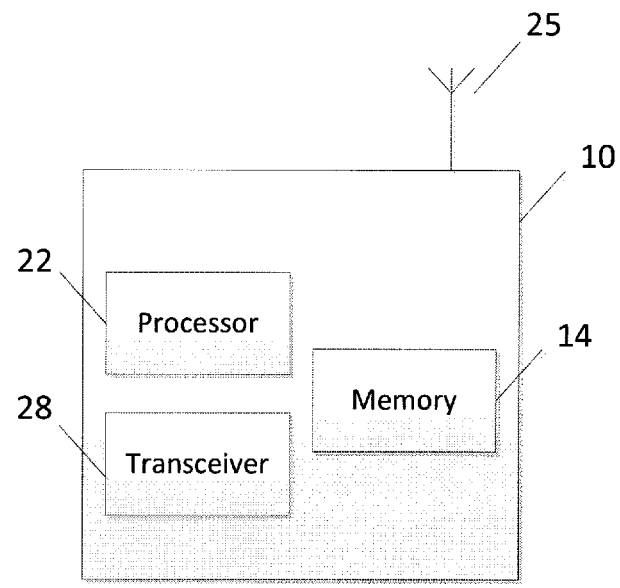
FIG. 5a illustrates a block diagram of an apparatus, according to an embodiment.

It will be readily understood that the components of the invention, as generally described and illustrated in the figures herein, may be arranged and designed in a wide variety of different configurations. Thus, the following detailed description of embodiments of systems, methods, apparatuses, and computer program products of PRACH selection and random access response (RAR) detection, for example, for 3GPP Rel-13 low complexity UEs and/or UEs in coverage enhancement (CE) mode, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

3GPP Rel-13 includes a work item entitled "Further LTE Physical Layer Enhancements for MTC" (RP-141660). The purpose of this work item is to specify a new low-complexity UE for machine-type communications (MTC) operation in LTE, to support coverage enhancement (CE) for both Rel-13 low-complexity UE and UE operating in CE compared to existing LTE networks.

The current working status on PRACH/RAR from RAN1 is discussed in the following. RAN1 has agreed that coverage enhancement of PRACH (RACH message 1) will be achieved through repetition of the legacy PRACH formats. Multiple PRACH repetition levels will be supported. RAN1 has agreed as a working assumption that the maximum number of levels is 3 (i.e. 4 if the case without repetition is included). The number of levels should be configurable by eNB up to the maximum number.

RAN1 has also agreed to define one or more additional PRACH time/frequency resource regions for UEs operating CE, apart from the regions for the legacy PRACH configuration. Within such regions, code multiplexing of UEs will be possible through allocation of different PRACH preamble sequence groups to UEs with different repetition levels. Other details are for further study. Furthermore, RAN1 has agreed that PRACH is used to identify Rel-13 low complexity UEs. The details are for further study.

The random access response (RAR) messages for Rel-13 low complexity UEs and UEs operating CE are transmitted separately from RAR messages for other UEs. Also, RAR intended for Rel-13 low complexity UEs and UEs operating CE can support PDSCH subframe bundling/repetition with multiple bundle sizes/repetition levels. After the initial random access procedure, for a physical channel using repetition for coverage enhancement, the repetition level is up to the network.

It was also discussed by RAN1 that, for initial random access, there is one to one mapping between PRACH repetition level and PRACH resource set. UE selects a PRACH repetition level and transmits the PRACH preamble using the PRACH resource set according to the selected PRACH repetition level. And the mapping information could be informed to UE by system information message.

In summary, during the RA procedure, the preamble needs to be repeated to achieve the coverage extension for PRACH, and the RAR message (or the PDCCH for scheduling RAR message) may need repetition as well.

According to 3GPP TS 36.321, once the Random Access Preamble is transmitted and regardless of the possible occurrence of a measurement gap, the UE monitors the physical downlink control channel (PDCCH) of the primary cell (PCell) for Random Access Response(s) identified by the Random Access Radio Network Temporary Identifier (RA-RNTI) defined below, in the RA Response window which starts at the subframe that contains the end of the preamble transmission plus three subframes and has length ra-ResponseWindowSize subframes.

This means that the earliest time when the network can transmit the RACH response is 3 subframes later from the end of RACH Preamble. If different UEs start repeating preambles on different PRACH resources, the eNB may not be able to decide the completion or end of the RACH preamble repetitions of a specific UE and therefore has a problem in receiving RAR from the UE.

FIG. 1 is a block diagram illustrating an example of this problem. As illustrated in FIG. 1, it is supposed that the repetition number of preamble is 10 and the eNB set the PRACH configuration index to 12, which means the UE could select subframe number #0, #2,#4, #6 and #8 as the PRACH occasion for sending preamble. For example, as depicted in FIG. 1, UE1 chooses to transmit preamble from subframe #0 of system frame number (SFN) #1, and the preamble repetitions for UE1 are transmitted at the following available PRACH occasions. While the UE2 transmits preamble initially from subframe #8 of SFN #1, then the eNB may not be able to understand when the initial transmission of the preamble for UE2 starts from in this case. If the eNB thinks the repetition of UE2 is ended at subframe 0 of SFN #3, it may send RAR at subframe #5 of SFN #2, however UE 2 is actually expecting RAR starting from subframe #9 of SFN #3.

Therefore, embodiments of the invention provide mechanisms so that a UE can avoid missing the potential RAR transmissions from an eNB. For example, some embodiments provide a solution so that the UE can avoid missing the potential RAR transmissions from the eNB for Rel13 low-complexity UEs or/and UEs in coverage enhancement mode.

In one embodiment, a starting point is specified for preamble repetition, i.e., a preamble attempt (a bundle of successive preamble repetition) can only start at a specific PRACH occasion so that all the UEs start preamble repetition on the same PRACH resource, and the eNB can tell when a repetition series is over and send a RAR. The RAR can also be repeated within a window. In one embodiment, a UE only needs to monitor RAR after the whole repetition, and if no RAR received, it waits for a next PRACH resource where it can start a re-attempt.

In another embodiment, a UE can send preamble at any subframe with PRACH resource corresponding to the repetition level, and monitor RAR after sending each preamble (also within a bundle of repetition), but skips the subframes when it has to do the preamble retransmission because for half duplex UEs it cannot perform transmission and reception at the same time transmission interval (TTI) (eNB needs to take it into account as well not to schedule RAR at those subframes.).

In certain embodiments, the UE may for instance decide preamble repetition level for initial access based on reference signal received power (RSRP)/reference signal received quality (RSRQ) comparing to threshold broadcasted for different levels.

Thus, embodiments provide a PRACH selection for preamble transmission and RAR detection procedure to avoid the potential confusion for monitoring RAR caused by preamble/RAR repetition. One embodiment is directed to specifying a starting point of preamble repetition, for example such that a preamble attempt (a bunch of preamble repetition) only starts from a specific subframe/system frame derived from the configured PRACH resource and repetition level. For example, in an embodiment, the starting point of preamble repetition may be specified according to the following formulation:

$$(SFN*PRACH\ density + i\_PRACH) \bmod number\_of\_repetition = 0,$$

where PRACH density is the total number of PRACH resources for the concerned repetition level in one frame (e.g., 5 PRACHs in one frame); i_PRACH is number $x^{th}$ PRACH resource in a frame (e.g. 0, 1, 2, 3, 4 refers to the subframe with number $0^{th}$, $1^{th}$, $2^{th}$, $3^{rd}$, $4^{th}$ PRACH resource); number_of_repetition is number of preamble repetitions for the concerned repetition level (e.g., 10 times preamble repetition). FIG. 2 illustrates an example with 5 PRACH resources per frame and 10 time preamble repetition.

With the above formulation, a starting point can be obtained for preamble repetition with the following (SFN, number $x^{th}$ PRACH resource in a frame) combinations:
(0, 0)
(2, 0)
(4, 0)
(6, 0)

In this embodiment, RAR reception (e.g., with x times repetition) may start after the whole bundle of preamble repetition, and UE may combine x consecutive TBs for RAR repetitions according to the repetition level for RAR.

If there is a common search space for RAR, the RA-RNTI used for RAR detection is the one of the PRACH resource where the first transmission of the bundle of preamble repetition. If there is no common search space for RAR, which means on RA-RNTI for RAR scheduling, to have the flexibility of eNB starting RAR transmission at any subframe within the RAR window, it becomes complicated for RAR reception as well. The UE needs different buffer for RAR reception to combine transport block (TB) of, for example, subframe n+3~n+3+x, n+4~n+4+x, n+5~n+5+x . . . . It is noted that the formulation for deriving the PRACH occasion for Rel-13 low-complexity UEs or/and UEs in coverage enhancement mode is just an example which may be enhanced or extended further.

According to certain embodiments, the UE and eNB may derive the specific system frame and subframe for PRACH preamble transmission based on the repetition level and the PRACH configuration. The derivation of the specific system frame and subframe for PRACH occasion shall be specified in 3GPP TS 36.211 as supplementary to existing PRACH configuration, or 3GPP TS 36.321 for Random Access Resource selection when determine the next available subframe containing PRACH for a preamble repetition level.

In another embodiment, the UE may send preamble at any subframe with PRACH resource corresponding to the repetition level, meaning that when RAR window starts is associated with the first preamble transmission. In this embodiment, the UE may monitor RAR during the window, but skip the ones when it has to perform the preamble retransmission (eNB needs to take it into account as well not to schedule RAR at those subframes). In this case, the exiting size of RAR window is extended and the eNB may configure different RAR window size mapping to the different repetition level. Even if the eNB wrongly determines the end of the preamble repetition from UE2, the UE2 would still be able to receive RAR according to this embodiment, as illustrated in FIG. 3.

With respect to possible updates to 3GPP specifications, according to embodiments, the start point of the RA Response window may be specified for Rel-13 low complexity UE and/or UE in coverage enhancement mode as follows, for example, in 3GPP TS 36.321: In case the preamble repetition is required for the Rel-13 low-complexity UEs or UEs in coverage enhancement mode, the UE shall monitor the RAR in the RA Response window which starts at the subframe that contains the end of the initial preamble transmission plus three subframes and has length ra-ResponseWindowSize subframes.

For example, in 3GPP TS 36.331, a list of ra-ResponseWindowSize might be defined mapping to different repetition level, as illustrated in FIG. 4.

FIG. 5a illustrates an example of an apparatus 10 according to an embodiment. In an embodiment, apparatus 10 may be a node, host, or server in a communications network or serving such a network. For example, apparatus 10 may be a network node or access node for a radio access network, such as a base station, node B or eNB in LTE-A, or an access node of 5G radio access technology. It should be noted that one of ordinary skill in the art would understand that apparatus 10 may include components or features not shown in FIG. 5a.

As illustrated in FIG. 5a, apparatus 10 includes a processor 22 for processing information and executing instructions or operations. Processor 22 may be any type of general or specific purpose processor. While a single processor 22 is shown in FIG. 5a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, as mentioned above, apparatus 10 may be a network node or access node, such as a base station, node B, or eNB, or an access node, for example. According to one embodiment, apparatus 10 may be controlled by memory 14 and processor 22 to specify a starting point for preamble repetition with a repetition level such that all UEs of the same repetition level (i.e., among those UEs served by the network node) start the preamble repetition on the same PRACH resource, to determine when a series of the preamble repetition is finished, and to transmit a RAR when the repetition series is finished. In one example, the preamble repetition may include one or more preamble attempts.

According to an embodiment, apparatus 10 may be further controlled by memory 14 and processor 22 to repeat the transmitting of the random access response (RAR) within a window. In one embodiment, the preamble repetition starts from a specific frame and subframe derived from the physical random access channel (PRACH) resource and repetition level, and/or derived from the SFN. According to an embodiment, apparatus 10 may be controlled by memory 14 and processor 22 to specify the starting point for the preamble repetition according to the following formula:

$$(SFN*PRACH\ density + i\_PRACH) \bmod number\_of\_repetition = 0,$$

where SFN is the system frame number, PRACH density is the total number of PRACH resources for the concerned repetition level in one frame, i_PRACH is number $x^{th}$ PRACH resource in a frame, and number_of_repetition is number of preamble repetitions for the concerned repetition level.

Figure 5B:
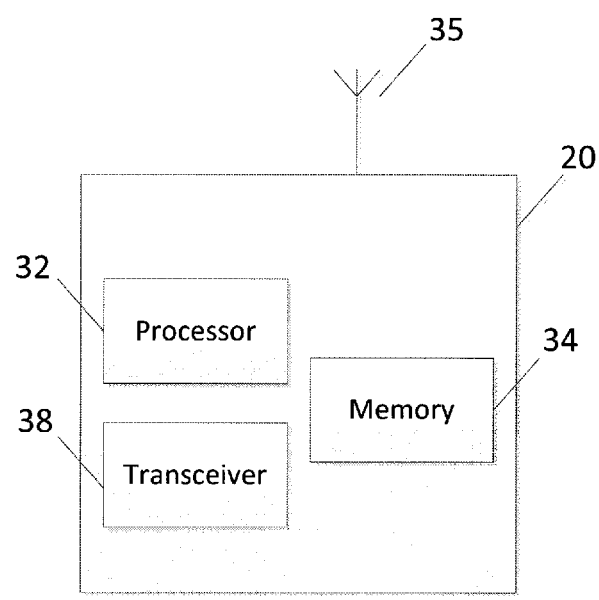
FIG. 5b illustrates a block diagram of an apparatus, according to another embodiment.

FIG. 5b illustrates an example of an apparatus 20 according to another embodiment. In an embodiment, apparatus 20 may be a node or element in a communications network or associated with such a network, such as a UE, mobile device, mobile unit, or other device. For instance, in some embodiments, apparatus 20 may be UE in LTE, LTE-A, or 5G. It should be noted that one of ordinary skill in the art would understand that apparatus 20 may include components or features not shown in FIG. 5b.

As illustrated in FIG. 5b, apparatus 20 includes a processor 32 for processing information and executing instructions or operations. Processor 32 may be any type of general or specific purpose processor. While a single processor 32 is shown in FIG. 5b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE. For example, apparatus 20 may be a 3GPP Rel-13 UE and/or a UE in CE mode. In this embodiment, apparatus 20 may be controlled by memory 34 and processor 32 to transmit preamble repetition starting from a specific frame and subframe derived from configured PRACH resource and a repetition level of the preamble repetition, and to receive at least one RAR when a series of the preamble repetition is finished. In one example, the transmitting of the preamble repetition may include the transmission of one or more preamble attempts. In an embodiment, apparatus 20 may be further controlled by memory 34 and processor 32 to transmit the preamble repetition at a starting point derived according to the following formula:

$$(SFN * PRACH\ density + i\_PRACH) \bmod number\_of\_repetition = 0,$$

where SFN is the system frame number, PRACH density is the total number of PRACH resources for the concerned repetition level in one frame, i_PRACH is number $x^{th}$ PRACH resource in a frame, and number_of_repetition is number of preamble repetitions for the concerned repetition level.

According to an embodiment, apparatus 20 may be controlled by memory 34 and processor 32 to combine x consecutive transport blocks for RAR repetitions according to a repetition level for the RAR.

In another embodiment, apparatus 20 may be controlled by memory 34 and processor 32 to transmit a preamble at any subframe with a physical random access channel (PRACH) resource corresponding to a repetition level of the preamble. In an embodiment, a RAR window starts with transmission of a first preamble attempt. In another embodiment, the window may be started after each transmission, so that the apparatus 20 maintains multiple overlapped RAR windows, one RAR window for each preamble transmission. Apparatus 20 may then be controlled by memory 34 and processor 32 to monitor for the random access response (RAR) during the random access response (RAR) window, but skip the monitoring during subframes where the apparatus performs retransmission of the preamble attempt.

Figure 6A:
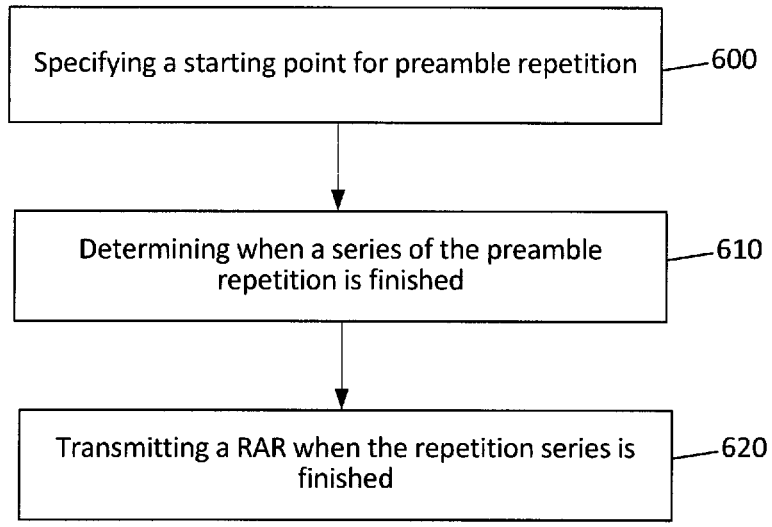
FIG. 6a illustrates a flow diagram of a method, according to an embodiment.

FIG. 6a illustrates an example flow diagram of a method for PRACH selection and/or RAR detection, according to one embodiment. In some embodiments, the method of FIG. 6a may be performed by a network node, such as a base station, access node, node B, and/or eNB, for example. As illustrated in FIG. 6a, the method may include, at 600, specifying a starting point for preamble repetition of a repetition level such that all UEs of the same repetition level start the preamble repetition on the same PRACH resource. The method may also include, at 610, determining when a series of the preamble repetition is finished, and, at 620, transmitting a RAR when the repetition series is finished.

According to an embodiment, the transmitting may include repeating the transmitting of the random access response (RAR) within a window. In one embodiment, the preamble repetition starts from a specific subframe derived from the physical random access channel (PRACH) resource and repetition level, and/or derived from the SFN. According to an embodiment, the specifying of the starting point may include specifying the starting point for the preamble repetition according to the following formula:

$$(SFN * PRACH\ density + i\_PRACH) \bmod number\_of\_repetition = 0,$$

where SFN is the system frame number, PRACH density is the total number of PRACH resources for the concerned repetition level in one frame, i_PRACH is number $x^{th}$ PRACH resource in a frame, and number_of_repetition is number of preamble repetitions for the concerned repetition level.

Figure 6B:
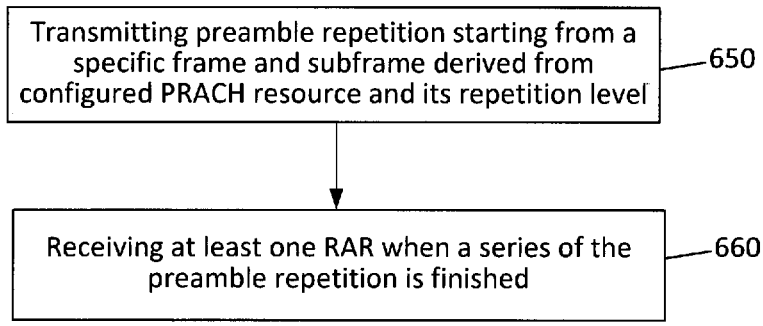
FIG. 6b illustrates a flow diagram of a method, according to another embodiment.

FIG. 6b illustrates an example flow diagram of a method for PRACH selection and/or RAR detection, according to one embodiment. In some embodiments, the method of FIG. 6b may be performed by a network node, such as a mobile device or UE, for example. As illustrated in FIG. 6b, the method may include, at 650, transmitting preamble repetition starting from a specific frame and subframe derived from configured PRACH resource and its repetition level and, at 660, receiving at least one RAR when a series of the preamble repetition is finished. In one example, the transmitting of the preamble repetition may include the transmission of one or more preamble attempts. According to one embodiment, the method may also include combining x consecutive transport blocks for RAR repetitions according to a repetition level for the RAR. In an embodiment, the transmitting may include transmitting the preamble repetition at a starting point derived according to the following formula:

$$(SFN*PRACH\ density + i\_PRACH) \bmod number\_of\_repetition = 0,$$

where SFN is the system frame number, PRACH density is the total number of PRACH resources for the concerned repetition level in one frame, i_PRACH is number $x^{th}$ PRACH resource in a frame, and number_of_repetition is number of preamble repetitions for the concerned repetition level.

Figure 6C:
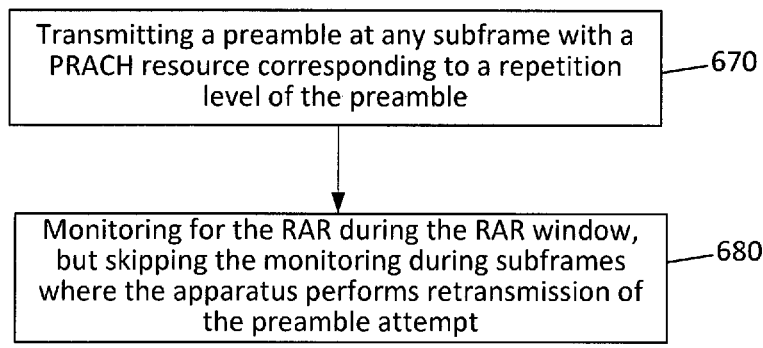
FIG. 6c illustrates a flow diagram of a method, according to another embodiment.

FIG. 6c illustrates an example flow diagram of a method for PRACH selection and/or RAR detection, according to another embodiment. In some embodiments, the method of FIG. 6c may be performed by a network node, such as a mobile device or UE, for example. As illustrated in FIG. 6c, the method may include, at 670, transmitting a preamble at any subframe with a physical random access channel (PRACH) resource corresponding to a repetition level of a preamble. In an embodiment, a RAR window starts with transmission of a first preamble attempt. In another embodiment, a window is started after each transmission, so that the UE maintains multiple overlapped RAR windows, one RAR window for each preamble transmission. The method may also include, at 680, monitoring for the random access response (RAR) during the random access response (RAR) window, but skipping the monitoring during subframes where the apparatus performs retransmission of the preamble attempt.

Figure 7A:
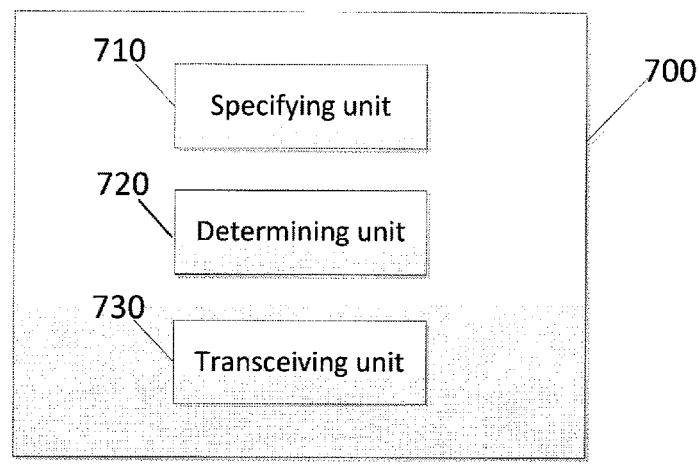
FIG. 7a illustrates a block diagram of an apparatus, according to an embodiment.

FIG. 7a illustrates a block diagram of an apparatus 700 according to an embodiment of the invention. In this embodiment, apparatus 700 may be a network node, such as a base or access station, node B, or eNB. As illustrated in FIG. 7a, apparatus 700 may include a specifying unit or means 710, a determining unit or means 720, or a transceiving unit or means 730. In an embodiment, specifying unit 710 may specify a starting point for preamble repetition of a repetition level such that all UEs of the same repetition level start the preamble repetition on the same PRACH resource. The determining unit 720 may determine when a series of the preamble repetition is finished, and transceiving unit 730 may transmit a RAR when the repetition series is finished.

According to an embodiment, the transceiving unit 730 may repeat the transmitting of the random access response (RAR) within a window. In one embodiment, the preamble repetition starts from a specific frame and/or subframe derived from the physical random access channel (PRACH) resource and repetition level. According to an embodiment, the specifying unit 710 may specify the starting point for the preamble repetition according to the following formula:

$$(SFN*PRACH\ density + i\_PRACH) \bmod number\_of\_repetition = 0,$$

where SFN is the system frame number, PRACH density is the total number of PRACH resources for the concerned repetition level in one frame, i_PRACH is number $x^{th}$ PRACH resource in a frame, and number_of_repetition is number of preamble repetitions for the concerned repetition level.

Figure 7B:
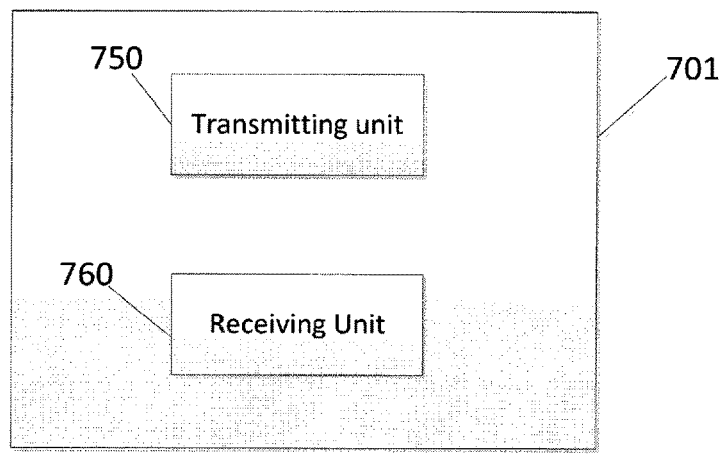
FIG. 7b illustrates a block diagram of an apparatus, according to another embodiment.

FIG. 7b illustrates a block diagram of an apparatus 701 according to an embodiment of the invention. In this embodiment, apparatus 701 may be a mobile device, such as a UE (e.g., 3GPP Rel-13 low complexity UE and/or UE in CE mode). As illustrated in FIG. 7b, apparatus 701 may include a transmitting unit or means 750 and a receiving unit or means 760. In this embodiment, transmitting unit 750 may transmit preamble repetition starting from a specific frame and subframe derived from configured PRACH resource and its repetition level. Receiving unit 760 may then receive at least one RAR when a series of the preamble repetition is finished. In one example, the transmitting of the preamble repetition may include the transmission of one or more preamble attempts. According to one embodiment, the apparatus may also include a combining unit or means for combining x consecutive transport blocks for RAR repetitions according to a repetition level for the RAR. In an embodiment, the transmitting unit may transmit the preamble repetition at a starting point derived according to the following formula:

$$(SFN*PRACH\ density + i\_PRACH) \bmod number\_of\_repetition = 0,$$

where SFN is the system frame number, PRACH density is the total number of PRACH resources for the concerned repetition level in one frame, i_PRACH is number $x^{th}$ PRACH resource in a frame, and number_of_repetition is number of preamble repetitions for the concerned repetition level.

Figure 7C:
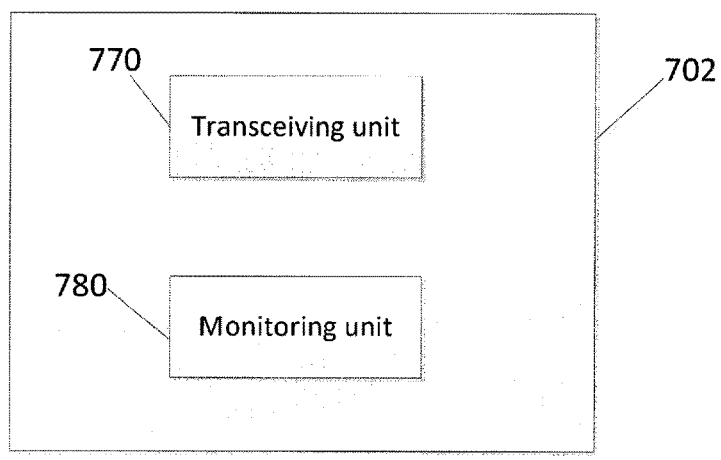
FIG. 7c illustrates a block diagram of an apparatus, according to another embodiment.

FIG. 7c illustrates a block diagram of an apparatus 702 according to another embodiment of the invention. In this embodiment, apparatus 702 may be a mobile device, such as a UE (e.g., 3GPP Rel-13 low complexity UE and/or UE in CE mode). As illustrated in FIG. 7c, apparatus 702 may include a transceiving unit or means 770 and a monitoring unit or means 780. In an embodiment, transceiving unit 770 may transmit a preamble at any subframe with a physical random access channel (PRACH) resource corresponding to a repetition level of the preamble. In an embodiment, a RAR window starts with transmission of a first preamble attempt. In another embodiment, apparatus 702 may include means for starting a window after each transmission, so that the apparatus 702 maintains multiple overlapped RAR windows, one RAR window for each preamble transmission. The monitoring unit 780 may then monitor for the random access response (RAR) during the random access response (RAR) window, but skip the monitoring during subframes where the apparatus 702 performs retransmission of the preamble attempt.

In some embodiments, the functionality of any of the methods described herein, such as those illustrated in FIGS. 6a, 6b, and 6c discussed above, may be implemented by software and/or computer program code or portions of it stored in memory or other computer readable or tangible media, and executed by a processor. In some embodiments, the apparatuses described herein may be, included or be associated with at least one software application, module, unit or entity configured as arithmetic operation(s), or as a program or portions of it (including an added or updated software routine), executed by at least one operation processor.

Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality of any method or apparatus described herein may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method, comprising:
specifying, by a network node, a starting point for preamble repetition of a repetition level such that all user equipment (UEs) of a same repetition level start the preamble repetition on a same physical random access channel (PRACH) resource;
determining when a series of the preamble repetition is over; and
transmitting a random access response (RAR) when the repetition series is finished.

2. The method according to claim 1, further comprising repeating the transmitting of the random access response (RAR) within a window.

3. The method according to claim 1, wherein the preamble repetition starts from a specific subframe derived from the physical random access channel (PRACH) resource and repetition level, and/or derived from a system frame number (SFN).

4. The method according to claim 1, wherein the specifying further comprises specifying the starting point for the preamble repetition according to the following formula:

$$(SFN*PRACH\ density + i\_PRACH)\ modulo\ number\_of\_repetition = 0,$$

where SFN is the system frame number, PRACH density is the total number of PRACH resources for the concerned repetition level in one frame, i_PRACH is number $x^{th}$ PRACH resource in a frame, and number_of_repetition is number of preamble repetitions for the concerned repetition level.

5. An apparatus, comprising:
at least one processor; and
at least one memory including computer program code,
wherein the at least one memory and the computer program code are configured, with the at least one processor, to cause the apparatus at least to
specify a starting point for preamble repetition of a repetition level such that all user equipment (UEs) of a same repetition level start the preamble repetition on a same physical random access channel (PRACH) resource;
determine when a series of the preamble repetition is finished; and
transmit a random access response (RAR) when the repetition series is finished.

6. The apparatus according to claim 5, wherein the at least one memory and the computer program code are further configured, with the at least one processor, to cause the apparatus at least to repeat the transmitting of the random access response (RAR) within a window.

7. The apparatus according to claim 5, wherein the preamble repetition starts from a specific subframe derived from the physical random access channel (PRACH) resource and repetition level, and/or derived from a system frame number (SFN).

8. The apparatus according to claim 5, wherein the starting point for the preamble repetition is specified according to the following formula:

$$(SFN*PRACH\ density + i\_PRACH)\ modulo\ number\_of\_repetition = 0,$$

where SFN is the system frame number, PRACH density is the total number of PRACH resources for the concerned repetition level in one frame, i_PRACH is number $x^{th}$ PRACH resource in a frame, and number_of_repetition is number of preamble repetitions for the concerned repetition level.

9. A method, comprising:
transmitting, by a user equipment, preamble repetition starting from a specific frame and subframe derived from configured physical random access channel (PRACH) resource and a repetition level of the preamble repetition; and
receiving at least one random access response when a series of the preamble repetition is finished.

10. The method according to claim 9, wherein the transmitting further comprises transmitting the preamble repetition at a starting point derived according to the following formula:

(SFN*PRACH density+i_PRACH) modulo number_of_repetition=0, where SFN is the system frame number, PRACH density is the total number of PRACH resources for the concerned repetition level in one frame, i_PRACH is number $x^{th}$ PRACH resource in a frame, and number_of_repetition is number of preamble repetitions for the concerned repetition level.

11. The method according to claim 9, further comprising combining x consecutive transport blocks for random access response (RAR) repetitions according to the repetition level.

12. An apparatus, comprising:
at least one processor; and
at least one memory including computer program code, wherein the at least one memory and the computer program code are configured, with the at least one processor, to cause the apparatus at least to
transmit preamble repetition starting from a specific frame and subframe derived from configured physical random access channel (PRACH) resource and a repetition level of the preamble repetition; and
receive at least one random access response when a series of the preamble repetition is finished.

13. The apparatus according to claim 12, wherein the at least one memory and the computer program code are further configured, with the at least one processor, to cause the apparatus at least to transmit the preamble repetition at a starting point derived according to the following formula:

(SFN*PRACH density+i_PRACH) modulo number_of_repetition=0, where SFN is the system frame number, PRACH density is the total number of PRACH resources for the concerned repetition level in one frame, i_PRACH is number $x^{th}$ PRACH resource in a frame, and number_of_repetition is number of preamble repetitions for the concerned repetition level.

14. The apparatus according to claim 12, wherein the at least one memory and the computer program code are further configured, with the at least one processor, to cause the apparatus at least to combine x consecutive transport blocks for random access response (RAR) repetitions according to the repetition level.

15. The apparatus according to claim 12, wherein the apparatus comprises a 3GPP release 13 low complexity user equipment and/or a user equipment in coverage enhancement mode.

16. A method, comprising:
transmitting, by a user equipment, a preamble at any subframe with a physical random access channel (PRACH) resource corresponding to a repetition level of the preamble,
wherein a random access response (RAR) window starts with transmission of a first preamble attempt;
monitoring for the random access response (RAR) during the random access response (RAR) window, but skipping the monitoring during subframes where the user equipment performs retransmission of the preamble attempt.

17. The method according to claim 16, further comprising starting a window after each transmission such that the user equipment maintains multiple overlapped RAR windows, with one RAR window for each preamble transmission.

18. An apparatus, comprising:
at least one processor; and
at least one memory including computer program code, wherein the at least one memory and the computer program code are configured, with the at least one processor, to cause the apparatus at least to
transmit a preamble at any subframe with a physical random access channel (PRACH) resource corresponding to a repetition level of the preamble,
wherein a random access response (RAR) window starts with transmission of a first preamble attempt;
monitor for the random access response (RAR) during the random access response (RAR) window, but skip the monitoring during subframes where the apparatus performs retransmission of the preamble attempt.

19. The apparatus according to claim 18, wherein the at least one memory and the computer program code are further configured, with the at least one processor, to cause the apparatus at least to start a window after each transmission such that the user equipment maintains multiple overlapped RAR windows, with one RAR window for each preamble transmission.

20. A computer program, embodied on a non-transitory computer readable medium, the computer program configured to control a processor to perform a method according to claim 1.

* * * * *